Dec. 29, 1959  V. E. FIRST ET AL  2,918,801
PROCESS AND APPARATUS FOR SEPARATING GAS MIXTURES
Filed Oct. 10, 1955  2 Sheets-Sheet 2

INVENTORS
VINCENT E. FIRST
EDWIN L. PAULSEN
BY Thomas J. O'Brien
ATTORNEY

United States Patent Office 2,918,801
Patented Dec. 29, 1959

2,918,801

PROCESS AND APPARATUS FOR SEPARATING GAS MIXTURES

Vincent E. First, Kenmore, and Edwin L. Paulsen, Snyder, N.Y., assignors to Union Carbide Corporation, a corporation of New York Application October 10, 1955, Serial No. 539,415

12 Claims. (Cl. 62—14)

This invention relates to improved methods of thawing and restarting low temperature gas separation plants. It particularly concerns the cleaning and restarting of air separation plants having a low temperature liquid supply accessible thereto.

It is the general purpose of this invention to provide new and improved methods of thawing and restarting low temperature gas separation plants, utilizing a low temperature liquid having a composition similar to one of the liquids involved in the separation to effect desired cleaning of the gas mixture during certain periods in the warming and cooling of the plant.

A specific object of this invention is to provide an improved method of thawing low temperature gas separation plants, by which such plants may be defrosted rapidly and efficiently.

Another specific object of this invention is to provide an improved method of restarting low temperature gas separation plants, which allows faster cooling of the parts of such plant while maintaining the rectification apparatus clean and dry.

Figure 1:
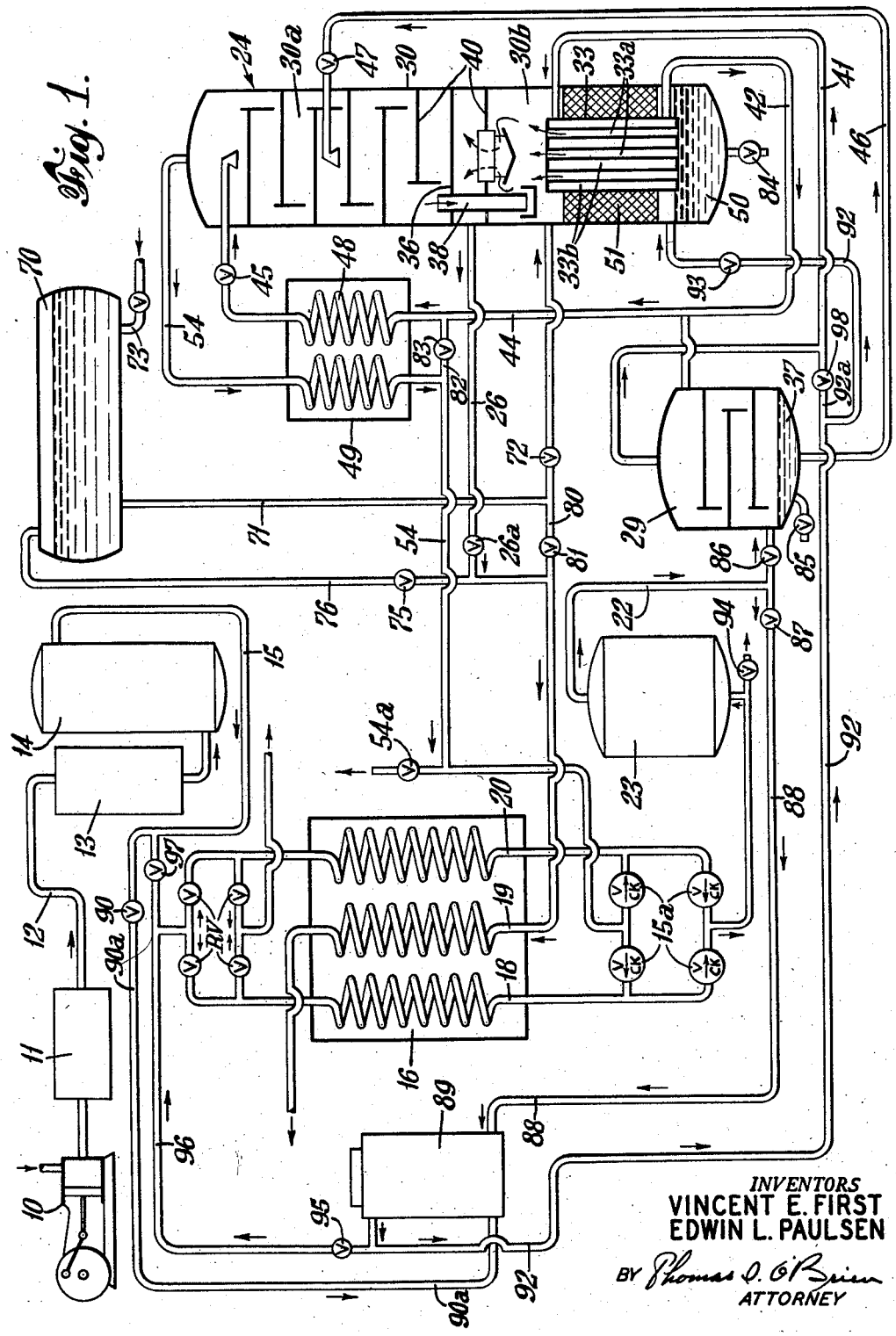
Figure 2:
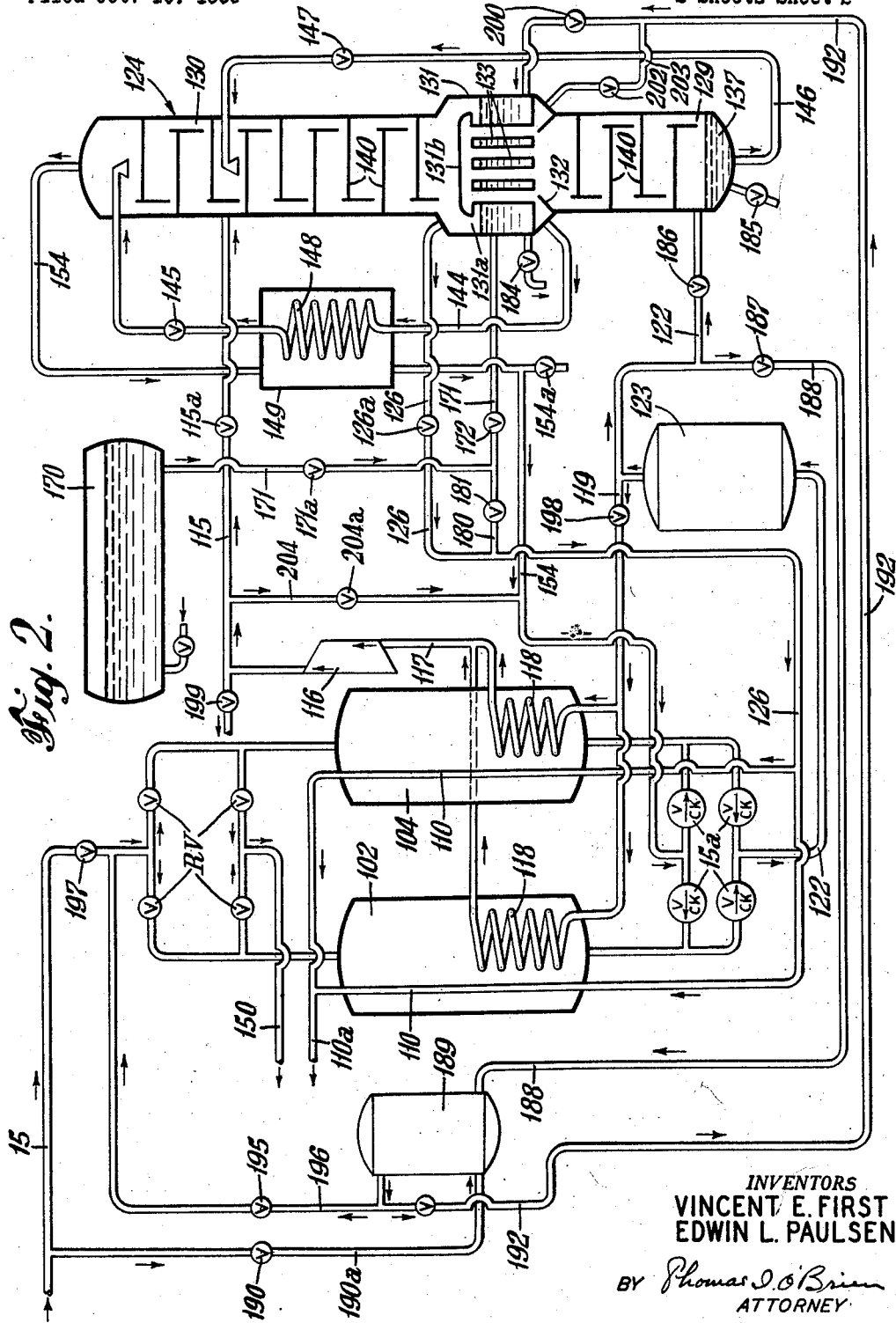

These and other objects, features and advantages of the present invention will become apparent from the following detailed description of the accompanying drawings in which:

Figure 1 is a schematic flow diagram of an exemplary air separation system without mechanical refrigeration-producing devices, illustrating the practice of the principles of the present invention; and Figure 2 is a schematic flow diagram of an exemplary air separation system utilizing mechanical refrigeration-producing devices, also illustrating the practice of the principles of the present invention.

Referring now to Fig. 1 in the drawing, an apparatus for separating a gas mixture, such as air, by rectification includes a reciprocating compressor 10, which in the type of plant illustrated, generally compresses the air to be separated to a relatively low pressure of about 70 p.s.i.g. (pounds per square inch gauge). The air is then passed through a water-cooled after-cooler 11 to remove the heat of compression and thence through a conduit 12 to a baffle type separator 13, which removes most of the atmospheric moisture and entrained lubricant and moisture carried over from the aftercooler. The air then flows through oil removal trap 14 in which the remainder of the entrained moisture and oil drops out. The air subsequently is conducted by a conduit 15 to the inlet end of a reversing heat exchanger 16. Although a reversing heat exchanger has been shown for illustration purposes, it is to be understood that the invention is equally applicable to other reversible heat exchange zone systems such as that shown in Fig. 2, for example, employing regenerators.

The reversing heat exchanger 16 has passageways 18, 19 and 20. Incoming compressed air flowing in one direction through the heat exchanger is cooled to substantially its condensation temperature by effluent nitrogen and oxygen products flowing through the heat exchanger in the opposite direction. The countercurrent flows of the compressed air and nitrogen product are periodically alternated between passageways 18 and 20 by reversing valves RV at one warm end and check valves 15a at the cold ends of the reversing heat exchanger, so that impurities in the air stream that are deposited and accumulated in solid or liquid phase on the surfaces of a passageway in which the air is flowing will be regularly removed by the effluent nitrogen product during the next phase of operation when the latter flows through the same passageway. The oxygen product is conducted through non-reversing passageway 19 in the heat exchanger to recover its refrigeration without contaminating it before it is discharged from the system to the consumer's supply line.

Residual hydrocarbon impurities and particles of residual carbon dioxide are removed from the compressed air stream by an adsorbent trap 23 disposed in a conduit 22 leading from the cold end of the heat exchanger 16 to the high pressure chamber or lower column 29 of a two stage air rectification column indicated generally at 24. As will be seen hereinafter, the air is cleaned substantially completely in the heat exchanger 16 not only during regular operation but also during start-up and part of the thaw-out period. This permits the use of the adsorbent trap 23 as a replacement for the usual scrubber chamber generally used for removing residual contaminants from the air stream and use of a single adsorbent trap where two would ordinarily be needed in the absence of such air cleaning during start-up. Breakup and damage to the adsorbent trap material by entrained moisture in the incoming air is also avoided.

The air rectification apparatus, in addition to the high pressure rectification chamber or lower column 29, includes an upper column 30 having a rectification section 30a and a reboiler section 30b at a lower part of the column. The reboiler includes an evaporator-condenser 33 having upwardly extending vaporizing tubes 33a. The enclosed space in the evaporator-condenser about the outsides of the tubes forms a condensing chamber 33b, which is connected with the high pressure column 29 through conduit 41 and 42, conduit 41 leading from an upper part of the lower column to a gas inlet of the condensing chamber 33b and conduit 42 leading from a liquid outlet of the condensing chamber to the top of lower column. The rectification chambers 29 and 30 may be provided with liquid-gas contact surfaces 40, which may, for example, be trays.

Compressed air entering the lower column through conduit 22 is rectified to produce an oxygen enriched liquid fraction, which accumulates at the bottom or "kettle" portion 37 of the lower column, and a nitrogen-rich vapor fraction, which passes upwardly through conduit 41 into the condensing chamber 33b of the reboiler 30b. The vapor passed into the condensing chamber is under a pressure which approximates that of the air compressor discharge (about 70 p.s.i.g.) and which is substantially higher than that of the liquid passing through tubes 33a. Consequently the vapor has a higher boiling temperature at such pressure than the liquid and the former is condensed by the latter which evaporates simultaneously.

The condensed nitrogen-rich vapor is withdrawn from chamber 33b and split into two streams; part of this liquid is throttled to a lower pressure and passed to the top of the upper column through a conduit 44 connected with conduit 42 and having a throttle valve 45, and the remainder of the condensed nitrogen-rich liquid is returned to lower column 29 and is employed as reflux liquid for washing down oxygen out of the rising vapor in the lower column. Oxygen-enriched liquid collected in the kettle 37 is transferred to an intermediate part of the upper column 30a through a conduit 46, the higher pressure liquid being throttled to a low pressure by a throttle valve 47 in conduit 46 before it is delivered into the upper column. The liquids transferred to the upper column provide reflux and are further rectified to obtain a cold, gaseous nitrogen product and an oxygen product of desired purity. The shelf nitrogen transfer liquid may be subcooled before throttling by heat exchange with the effluent nitrogen product so as to avoid excessive vaporization when throttled and to superheat the nitrogen product. In the embodiment shown, this is accomplished by passing the shelf nitrogen transfer liquid through a coil 48 in a waste nitrogen heat exchanger 49.

The descending reflux liquid in the upper rectification column 30 becomes increasingly richer in oxygen content as it passes downwardly toward the bottom of the column. This liquid is led from the lowermost tray of the column, indicated schematically at 36, through a downspout 38, into the reboiler 33b. A liquid separator is shown schematically at 40, between the rectifying section 30a and the reboiler 30b, for separating liquid from the vaporized liquid passing upwardly from tubes 33a into the rectifying section. Oxygen-rich liquid draining downwardly through downspout 38 flows into a reservoir 50 surrounding the sides and bottom of the evaporator-condenser 33. An adsorbent body 51 is disposed in the reservoir in position to be traversed by liquid passing through the reservoir for separating and accumulating in a substantially harmless manner impurities in the reboiler liquid. Liquid in reservoir 50 passes by gravity flow into the bottoms of tubes 33a and is vaporized by heat exchange with condensing fluid on the shell side of the tubes. Part of this vapor withdrawn from the rectification apparatus as oxygen-make product through conduit 26, and the remainder of the vapor passes upwardly into the rectifying section 30a to provide refluxing vapor for the rectification. The nitrogen product of rectification is withdrawn from the upper column 30 through a conduit 54, which delivers the cold, gaseous effluent to waste nitrogen heat exchanger 49 wherein it is superheated by heat exchange with nitrogen-rich transfer liquid passing through coil 48.

The rectification system of Fig. 1 does not have a specific mechanical refrigeration-producing device, and the low temperature refrigeration needed for operation is obtained by the evaporation of a low temperature liquid, preferably liquid oxygen, which is fed from a storage tank 70 disposed within a highly efficient heat insulation (not shown). The liquid oxygen employed for this use may be shipped to the plant in liquid form. The tank 70 is filled through a liquid inlet connection 73. It will be understood that all the liquid oxygen shipped to the plant is used to furnish gaseous oxygen. However, by utilizing the refrigeration of the liquid oxygen to operate the air separation plant, a larger amount of oxygen can be produced than the amount of oxygen produced by just vaporizing the liquid oxygen from tank 70.

The tank 70 is preferably situated at a higher elevation than the rectifying column, as shown in Fig. 1, so that a gravity flow may be relied upon for draining liquid through the bottom of the storage tank to the column. In the illustrated embodiment, tank liquid is conducted by a conduit 71 to the reboiler chamber reservoir 50 where it is introduced into the oxygen-rich liquid to be vaporized in tubes 33a. The rate at which the liquid is drained from the storage tank into the reboiler 30b may be controlled by valve 72 in conduit 71. Various other schemes for feeding liquid from the storage tank to the upper column are equally suitable. For example, tank 70 may be positioned at a lower elevation than condenser 30b, providing a sufficient pressure differential is maintained between the tank and reboiler 30b to effect a liquid transfer from the tank into the reboiler.

In the operation of the plant, oxygen vapors are continuously produced over the liquid stored in tank 70 by evaporation of the stored liquid which results from heat leak. This oxygen vapor product may be advantageously blown off through a conduit 76 having a vent valve 75 to the oxygen make line 26, where it supplements the gaseous oxygen make product of the air separation plant. The refrigeration available in the gaseous oxygen from tank 70 can be thereby recuperated when it passes with the plant oxygen product through the heat exchanger 16 before being discharged to the consumer's supply line.

When the pipeline demand of a consumer is variable, the air separation plant of Figure 1 is constructed and operated to produce oxygen corresponding to the low constant demand rate. When demand exceeds the output of the air separation plant, the stored liquid oxygen in tank 70 can be conveniently drawn off and vaporized to supplement the oxygen output and satisfy the demand by means not illustrated.

Over a period of operation, the minute quantities of impurities, such as carbon dioxide and certain hydrocarbons in the air, that are not separated by the air cleaning treatment given the air in preparing it for rectification, enter the rectifying components of the system. These impurities accumulate and become concentrated in the adsorbent section of the oxygen reboiler in the low pressure rectification column where the oxygen-rich liquid is continuously boiled off; such concentrations saturate adsorbent and subsequent precipitations rapidly impair heat exchange efficiency and create explosive hazards. The rectification apparatus must be cleaned periodically to eliminate such impurities and the adsorbent traps must be periodically reactivated. This is accomplished by warming the various components of the plant to evaporate the impurities from the rectification apparatus and from the adsorbent traps. In order to resume operation it is then necessary to recool the various plant components to their respective operating temperatures. In thawing and recooling the plant, the stored liquid oxygen may be used advantageously to facilitate defrosting and to provide quick starting so as to minimize the time loss involved in shutdowns. Furthermore, the stored liquid is simultaneously vaporized, superheated, and may be passed to the consumer's supply line if desired in an economical manner.

In the present improved methods of thawing and restarting, the liquid oxygen from storage tank 70 is passed directly to the non-reversing pass of the heat exchanger 16 to cool incoming air entering through a reversing pass in countercurrent relation to the outflowing oxygen and thereby cleaning such air before it enters the rectification apparatus for either warming or cooling purposes. Air used for thawing and cooling is thus cleaned in the same manner and in the same apparatus as during regular operation, and such cleaning may be continued undiminished in degree during the periods when the use of clean air is required or desirable in defrosting or cooling certain components of the system.

During thaw out incoming air cleaned in this manner is passed through a cold end adsorbent trap and thereafter heated and used for defrosting the reboiler adsorbent trap and the reboiler, the upper column and the effluent nitrogen heat exchanger. This treatment is continued until the reboiler adsorbent trap is heated at least to reactivating temperature, a temperature which will at the same time provide complete thawing of the upper column and the heat exchanger. By so cleaning the air used in defrosting these components, impurities in the air, such as water and traces of oil, which may be harmful to the adsorbent material at warm-up temperatures, are removed before the thaw-out air reaches the trap. When the reboiler adsorbent trap, upper column and nitrogen effluent heat exchanger have been thawed, they are bottled up and the other parts of the system may be thawed with heated raw atmospheric air.

With reference now to Fig. 1 of the drawing, thaw-out is accomplished according to the present invention as follows: Valve 72 is closed to stop the flow of stored liquid oxygen from tank 70 to the reboiler 30b, and valve 81 in by-pass 80 interconnecting the stored liquid oxygen feed conduit 71 and the oxygen make conduit 26 is opened to pass liquid oxygen from tank 70 through conduit 26 to the non-reversing heat exchange pass 19, where it is passed in countercurrent heat exchange relation with incoming compressed air entering the system alternately or in parallel through reversing passes 18 and 20. A valve 26a in conduit 26 is closed to prevent back up of liquid into column 30. Drain valves 84 and 85 are open to drain the liquids from the oxygen reboiler 30b and from the kettle 37, respectively. In recovering the refrigeration of the outgoing liquid oxygen in pass 19, the air is cooled to about −40° C., a temperature sufficiently low to freeze moisture out of the air as in normal operation. During this first stage of thawing, the high pressure rectifying column is isolated from the warming fluid circuit by closing a valve 86 in conduit 22. At the same time valves 87 and 93 in conduits 88 and 92, respectively, are opened to cause the compressed air leaving the cold and adsorbent trap 23 to flow through a heater 89 and then to the reboiler 30b. There, the warm air passes up through the adsorbent body 51, the tubes 33a and the rectifying section 30a. It then passes out of the upper column through conduit 54 and through the effluent nitrogen heat exchanger 49. A vent valve 54a connected to the effluent nitrogen conduit 54 is opened during this stage to blow off the warmup air as it leaves heat exchanger 49.

When the reboiler adsorption trap is heated to a reactivation temperature of about 90° C., this vessel, the upper column and the nitrogen heat exchanger are completely thawed and the upper column may be bottled up to prevent recontamination during thawing of the remaining components. This is accomplished by closing vent valve 54a, drain valve 84, transfer valves 45 and 47, and thawout valves 87 and 93.

The remaining components, i.e. lower column, cold end adsorption trap, and reversing heat exchangers, may now be thawed with heated raw atmospheric air instead of the contaminant-free air used during the first phase of the thaw. The reasons are: (1) The air used for the second thawout phase is hotter. (2) The remaining components to be thawed have warmed to a certain extent during the first phase of the thaw and are less apt to freeze out contaminants from the heated raw air. (3) The most important is the relative positions of the reboiler absorption trap 51 and the cold end adsorption trap 23 in the cycle. As previously discussed, the reboiler trap is the "dead end" of the system and any impurities passing through the cold end trap will accumulate there. Consequently, it is necessary to take special precautions—impurity-free thawout air—to insure complete reactivation of this trap. Such an elaborate precaution is not necessary with the cold end trap as any remaining impurity traces can be carried over to the reboiler trap.

Therefore, for the second stage of thawing, valve 81 is closed to stop the flow of liquid oxygen from tank 70 to heat exchanger 16. During this stage also, valve 86 in conduit 22 is reopened, and a drain valve 94 on the upstream side of the cold end adsorbent trap 23 is opened. The normally open valve 97 in conduit 15 leading from compressor 10 to reversing valves RV at the warm end of heat exchanger 16 is closed and a valve 90 in conduit 90a leading to heater 89 is opened to admit the air from conduit 15 into the heater. Normally closed valve 95 in a connection 96 is opened to pass part of the heated air from the heater outlet to the reversing valves RV at the warm end of the heat exchanger 16 and a valve 98 in a connection 92a to the upper end of the lower column is opened to pass the rest of the heated air to the lower column 29 and the nitrogen side 33b of the evaporator-condenser 33 by way of conduits 92, 92a, and 41.

Warm air delivered to the reversing valves RV is directed through the reversing passes 18 and 20 either alternately or in parallel and then out of the system through drain valve 94. Although air impurities are deposited in the reversing passes during the thawout procedure, the buildup is not sufficient to clog these passes and the impurities are swept out through drain valve 94 during the second half of the thawout when temperatures are above ambient.

The warm air passing through line 92a is split into two parts, one portion going directly to the lower column through conduit 41 and the remainder passing through another portion of conduit 41 to the condensing space 33b of the evaporator-condenser 33 and thence downwardly through conduit 42 and the lower column. Part of the warm air leaves the lower column through drain valve 85, and the remainder passes through conduit 22 and traverses the cold end adsorption trap 23 before discharge from the system through drain valve 94. When the cold end adsorption trap 23 reaches a sufficiently high temperature to assure complete defrosting and reactivation of the adsorbent material—about 90° C.—the thawout is complete. It should be noted that the rate of warmup of the various components can be adjusted at will by control of the thawout valves and the drain valves.

After the system has been cleaned and the valves 85, 90, 94, 95 and 98 closed, valve 97 in compressed air supply line 15 is reopened for starting the plant up again. In the present improved method of starting, liquid oxygen from the storage tank 70 is first passed directly to the non-reversing pass 19 of the heat exchanger 16 for cooling down the latter. Incoming compressed air then enters through a reversing pass of the heat exchanger 16 in countercurrent heat exchange relation with the oxygen and is thereby cooled to about −170° C. for removal of moisture, carbon dioxide, and hydrocarbon impurities in a normal way before entering the rectification apparatus 24. After giving up refrigeraton to the rectification equipment, the air exits through the reversing heat exchangers and sublimes the impurities which were deposited from the incoming air in the previous heat exchanger cycle. During the initial phase of cooling down, the low pressure column is isolated from the cooling fluid circuits, and cooling gas is not passed into this column until all pieces of air cleaning equipment have reached substantially normal operating temperatures. It will be seen that rapid cool-down of the plant is thus achieved without contaminating the equipment with unclean air. Moreover, it is assured that the reboiler 30b which is to contain the product oxygen, will remain clean and uncontaminated.

In detail, valves 26a, 45, 47 and 72, which were closed during the final stage of thawing, are kept closed to isolate the low pressure column 30. Valve 81 in upper column by-pass 80 is opened to pass liquid oxygen from tank 70 through conduit 26 and thence through heat exchanger pass 19 to cool the exchangers down to their operating temperature. The vaporized oxygen may be passed to the consumer's line or vented to the atmosphere. Air compressed to about 70 p.s.i.g. in compressor 10 is then admitted to the system alternately through passes 18 and 20. In recovering the refrigeration of the outgoing vaporizing liquid oxygen in pass 19, the air is cooled to about −170° C. to freeze moisture and $CO_2$ out of the air and onto the heat exchanger surfaces as in normal operation. The flow rates of air and oxygen are so controlled that the temperature of the air stream at a point half-way through the heat exchange process is roughly −100° C., thereby maintaining an approximately normal temperature pattern in the exchangers. The cooled air is passed through the cold end adsorbent trap 23, the higher pressure column 29 and the nitrogen condensing side 33 of the evaporator-condenser 33 by way of conduits 22, 41 and 42, thereby cooling this equipment to its operating temperature. The partially warmed air passes from column 29 and reboiler 30b through the nitrogen-rich liquid transfer conduit 44, but does not pass into the low pressure column with valve 45 closed. Instead, a by-pass 82 having a throttle valve 83 is provided between conduit 44 and the effluent nitrogen product conduit 54. During the initial stage of starting, valve 83 is opened to throttle air leaving the lower column 29 through conduit 44 to substantially atmospheric pressure and to pass such throttled air directly into the effluent nitrogen conduit 54 for passage out of the system alternately through passages 18 and 20 of exchanger 16 for cooling the incoming air and removing the deposited impurities.

When the cold end adsorbent trap 23, the nitrogen side 33b of the evaporator-condenser 33 and the lower column 29 have reached their operating temperature, valves 81 and 83 may be closed and the liquid oxygen feed valve 72 may be opened to admit stored liquid oxygen into the oxygen reboiler 30b, whereupon gas from the lower column starts to condense on the nitrogen side of the tubes 33a of evaporator-condenser 33. Valve 26a in the make oxygen conduit 26 from the upper column is also opened. The condensed air is returned to the lower column as described above and forms reflux liquid for operating the lower column. The nitrogen-rich liquid transfer valve 45 and the oxygen-enriched liquid transfer valve 47 may then be opened to provide refluxing liquids for operating the upper column, and full production may be established as soon as the proper reflux rates are obtained in the columns.

In the above procedures, liquid oxygen added to the system during thaw-out and start-up is vaporized and superheated during passage through the normal non-reversing pass 19 of the heat exchangers 16. The resulting uncontaminated gaseous oxygen may be passed directly to the consuming line, and, in this way, even though the plant itself is not producing oxygen during thaw-out and most of the start-up period, a clean, gaseous oxygen product is made available during most of the plant shut-down period. This is particularly advantageous for systems requiring a continuous gas supply, for it provides an economical method of maintaining at least part of the necessary supply during most of the non-production period of the plant and thereby reduces the required auxiliary product storage capacity. Furthermore, the use of liquid oxygen for cooling and cleaning incoming air during start-up considerably shortens the start-up period. For example, we have found that a liquid oxygen addition plant of the type described herein is at full production capacity of 99.5% oxygen in approximately six hours after a warm start-up, and, as previously described, the consuming means are supplied with the product gas during the interim period. For a gas plant of the same size using a work expander as its only source of low temperature refrigeration, approximately eighteen hours would be required to attain full production capacity.

Although the invention is particularly suited to gas separation systems having no mechanical refrigeration-producing devices, it may also be practiced with advantage in systems employing mechanical refrigeration-producing devices. Fig. 2 shows an illustrative embodiment of the application of the present invention to such a system. Thus in Fig. 2, incoming compressed air delivered to reversing valves RV through compressed air supply conduit 15 is cooled to substantially its condensation temperature by passage through alternately reversed regenerators 102 and 104. Reversing valves RV at the warm ends of the regenerators serve to direct incoming air through one regenerator while check valves 15a at the cold ends thereof serve to direct effluent nitrogen product through the other regenerator and to switch these flows periodically to provide alternate flow of nitrogen and air through each regenerator. Outflowing oxygen product is split and passed through both regenerators in closed embedded coil pasageways 110 that branch off from the oxygen make conduit 126 at the cold end of the regenerators.

The cooled air, which has been freed of most of its moisture and carbon dioxide in the regenerators, is led by conduit 122 through a cold end adsorbent trap 123 for removal of the residual impurities in the air. Cleaned air is led by conduit 122 from the cold end adsorbent trap to the lower end of an air-separating rectifying column 124. The later may be of customary construction, having a high pressure chamber 129 closed at its upper end by a condenser 131. The condenser operates to condense nitrogen-rich vapors rising in chamber 129, part of the condensed vapor falling back into the lower chamber to serve as reflux and part being collected on a shelf 132 for transfer by way of conduit 144 to the upper end of a low-pressure rectifying chamber 130 which is mounted above chamber 129 and has at its lower end a liquid oxygen collecting space 131a that surrounds the condenser 131. A throttle valve 145 in conduit 144 serves to throttle nitrogen transfer liquid to a lower pressure prior to its delivery into chamber 130. Oxygen-rich liquid that collects in the kettle 137 in the lower part of the high pressure rectification chamber 129 is conducted by a conduit 146 controlled by a throttle valve 147 to an intermediate part of the low pressure rectification column 130. Customary gas and liquid contact surfaces 140, such as trays or plates, are provided in the rectification chambers.

The nitrogen product of rectification leaves the low pressure rectification chamber 130 through a conduit 154 which passes the cold gaseous effluent through an effluent nitrogen heat exchanger 149 for subcooling the nitrogen transfer liquid in coil 148, as in Fig. 1, before delivering it to the check valves 15a at the cold end of the regenerators 102 and 104. The warmed nitrogen is directed by the reversing valves RV at the warm end of the regenerators through a conduit 150. The oxygen-rich liquid descending into the main condenser 131 is reboiled by the condensing nitrogen-rich vapor on the condensing side of tubes 133 in the condenser, part of the vaporized oxygen being withdrawn from the system through the oxygen-make conduit 126 and the regenerator passageway 110 and the rest of the vaporized oxygen being passed back up to the low pressure rectification. Part of the incoming cleaned air is withdrawn from conduit 122 downstream of the trap 123 through a conduit 119 and is work-expanded to provide the low-temperature refrigeration needed for operating the system. Since such air is already at condensation temperature, it must be warmed to provide efficient production of refrigeration by work-expansion. Such warming may be accomplished by passing the air withdrawn for this purpose through embedded coils 118 in the cold ends of the regenerators 102 and 104. The warmed air is then led by way of 117 to the inlet of a suitable work expander, which may, for example, be a turbine as schematically shown at 116. A conduit 115 conducts the expanded air to an intermediate part of the low pressure rectification chamber 130.

The operation of the system just described is believed evident. When normal operation is interrupted to clean the plant, refrigeration available from the vaporization of a stored cold liquid may be employed in the same manner as described in Fig. 1 to cool and clean incoming air during thaw-out and restarting. Stored liquid oxygen can be made available and accessible to the gas separation plant for this and other purposes, being made by the plant itself at a slow withdrawal rate from valve 184 during regular operation or being transported to the site of the plant by suitable transport. During peak periods of consumer demand and also during periods of thaw-out and restarting, the stored liquid can be vaporized and delivered into the consumer supply line to meet such demand exceeding plant production to provide uninterrupted delivery of oxygen.

The thaw-out procedure is as follows: First, drain valves 184 and 185 are opened to drain respectively the main condenser 131 and the kettle at the lower end of the lower column 129. Then the upper rectification column is defrosted with clean air, the thaw-out air being passed in heat exchange in the regenerators with liquid oxygen from a storage tank and then directly to the upper column. For this purpose, valve 198 in conduit 119 is closed to isolate the work-expander circuit, and valves 202, 186, 145 and 147 are closed to isolate the high pressure or lower rectification column 129. Valves 187 and 200 in conduits 188 and 192, respectively, are opened to cause incoming air to pass through heater 189 and thence through conduit 192 to the chamber 131a of reboiler 131 of the upper column. Valve 171a in conduit 171 is opened, valve 181 in conduit 180 is opened and valve 172 in conduit 171 is held closed to effect delivery of liquid oxygen from a tank 170 into the oxygen passageways 110 of the regenerators 102 and 104 by way of oxygen make conduit 126. Valve 126a in conduit 126 is closed to prevent back flow of liquid oxygen into the reboiler 131 during this period. Drain valve 154a in the nitrogen effluent conduit 154 and drain valve 199 in conduit 115 are opened to permit discharge of used warm-up air.

Incoming air entering the system through conduit 15 is delivered through the normally open valve 197 to reversing valves RV which direct the air through regenerators 102 and 104, either alternately or in parallel. This air is cooled and cleaned by refrigeration recovered from stored liquid oxygen passing through passageways 110. It is to be noted that during such heat exchange the liquid oxygen is evaporated and may be delivered into a consumer's supply line via discharge conduit 110a. The cooled and cleaned air passing out of the cold end of regenerators in conduit 122 flows through conduit 188 to heater 189 where it is heated before delivery into the reboiler 131 and upper column 130 by way of conduit 192. The warming air passes through the upper rectification column and leaves through drain valve 184, turbine discharge conduit 115 and the nitrogen effluent conduit 154, the air being discharged from conduit 115 through open drain valve 199 and from conduit 154 through open drain valve 154a after passage through the nitrogen effluent heat exchanger 149. When the upper column has reached defrosted temperature, transfer valves 145 and 147 in conduits 144 and 146 are opened for a short period to cause warm-up air to be back-blown through such valves and conduits for removal of any air impurities deposited during normal operation. The defrosting air passing to the lower column is blown out the open drain valve 185.

The defrosted upper column and reboiler are then isolated by closing valves 115a in turbine discharge conduit 115, transfer valves 145 and 147, drains 184 and 154a, valve 204a in conduit 204 connecting turbine exhaust conduit with the nitrogen effluent conduit, and valve 200 in conduit 192. The lower column 129 and the high pressure side of the reboiler may then be defrosted with clean air or with raw atmospheric air. If the former is to be used, valve 202 in conduit 203 connecting conduit 192 with the lower column is opened to pass heated air from heater 189 by way of conduits 192 and 203 into the lower column at shelf 132. After traversing the lower column the thaw-out air is discharged through open drain 185. When the lower column reaches defrosted temperature, the lower column is bottled up by closing valves 185, 187 and 202. Alternatively, when the lower column is defrosted with raw atmospheric air, as in Fig. 1, it is defrosted simultaneously with the remaining components as presently described.

Accordingly, the liquid oxygen flow from tank 170 to the regenerators is now stopped by closing valve 171a in conduit 171. During this final thaw-out stage, normally open valve 197 in supply conduit 15 is closed and valve 190 in conduit 190a leading from conduit 15 to the inlet of heater 189 is opened to direct incoming air first into the heater. Valve 195 in a conduit 196 connecting the heater outlet with the reversing valves RV at the warm ends of the regenerators is opened to effect passage of raw heated air through the regenerators 102 and 104 either alternately or in parallel. Valve 198 in the turbo-expander circuit conduit 119 is opened, and with valves 115a, 186, 187 and 204a closed, warm-up air passes from the regenerators 102 and 104 through the cold end adsorbent trap 123, the embedded coils 118 and the turbo-expander 116 before being discharged through vent 199. When the cold end adsorbent trap has reached a temperature sufficiently high to effect regeneration of the adsorbent material, thawing is complete.

In the case where warm raw air is to be used for defrosting the lower column, valve 202 in conduit 203 is opened during this last stage of thawing to direct part of the warmed air from heater 189 through conduits 192 and 203 into the lower column 129. With valves 186 and 187 closed and valve 185 opened, warm air passes downwardly through the lower column and is blown out through drain 185.

To bring the plan back down to operating temperatures, the stored liquid oxygen may be used to clean incoming air during the initial stage of starting so that the thawed and cleaned components do not become contaminated with impurities from warm start-up air. Accordingly, valves 171a and 181 are reopened to direct liquid oxygen from tank 170 into the effluent oxygen conduit 126 for passage through passageways 110 in the regenerators 102 and 104. In the meantime, the heater circuit is closed by closing valve 190, valves 195 and 202 (valve 187 being already closed). As soon as the liquid oxygen has cooled the regenerator beds to operating temperature, the compressed air supply valve 197 is reopened and compressed air is delivered to the warm end of the regenerators as in regular operation. The air is cooled and cleaned in traversing the regenerators and is then passed through the cold end adsorbent trap 123. With valve 198 still open and valve 186 still closed all the air is delivered to the turbine 116 by way of conduit 119 and coils 118. For this phase of starting, drain 199 is reclosed and valve 115a is reopened to pass air that has been cooled by work expansion in turbine 116 through conduit 115 into the upper column 130 for cooling the latter.

This warmed gas exits through the nitrogen effluent conduit 154 and enters the regenerators through the cold end check valves 15a where its remaining refrigeration is transferred to the incoming air. Impurities deposited in a regenerator during air flow therethrough are swept out by outflowing cooldown air passing therethrough after incoming air has ceased flow therein in a manner identical to normal operation. The cooldown air exits from the regenerators through the warm end reversing valves RV and conduit 150. In this way, the incoming air which has been cleaned in the regenerators by cooling and deposition of impurities and thereafter warmed in cooling down the cold end adsorbent trap is subsequently recooled by work-expansion before passage through the upper column and back through the regenerators. This procedure rapidly accelerates cool-down of these components of the system and is made possible by the initial cleaning of incoming air with the use of stored liquid oxygen, for there is no danger of carrying impurities into the upper column with the cooldown air. Passage of turbo-expanded air directly to the upper column instead of by-passing the column during the first portion of the start-up also contributes to shortening the start-up time.

Instead of passing all of the start-up air emerging from the cold end adsorbent trap 123 to the turbine 116, a minor portion may be directed through valve 186 in conduit 122 to the lower column 129 for cooldown thereof. In this case, the lower column start-up gas is passed through valves 145 and 147 in the shelf nitrogen and kettle transfer lines 144 and 146, respectively, to the upper column. There, it joins the start-up gas from the turbo-expander and is discharged therewith through conduit 154.

When the cold end adsorption trap 123 has been cooled to operating temperature the first phase of start-up is complete and liquid oxygen flow from tank 170 through the oxygen-make conduit 126 may be discontinued by closing valve 171a. Part of the start-up air from trap 123 may then be passed to the lower column for the latter's cool-down in the manner described in the previous paragraph. If air is already being passed to the lower column, then the proportion of this air with respect to the quantity passed to the turbo-expander will be increased.

Oxygen-enriched liquid is gradually produced by the refrigeration obtained from work-expansion in turbine 116 and by throttling of cold air in transfer lines 144 and 146. Eventually liquid accumulates on the shell side of the main condenser and condenser tubes 133 and condenses nitrogen-rich vapor within the tubes 133. When proper reflux rates have been established in the rectification columns, valve 126a in the oxygen-make conduit 126 may be reopened for normal operation.

The formation of reflux liquids may be accelerated during the second or final phase of restarting by passing liquid oxygen from the storage tank 170 to the oxygen-side 131a of the main condenser. For this purpose, valves 172 and valve 171a in conduit 171 may be opened and valve 181 in conduit 180 may be closed to effect delivery of liquid oxygen to the condenser. Such liquid will start to condense nitrogen-rich vapor within tubes 133 almost immediately, thereby providing reflux for the lower column much sooner than it takes when the only refrigeration available is that delivered by the work-expander and the Joule-Thomson effect obtained by throttling in the transfer conduits 144 and 146. Valve 126a is reopened and evaporated oxygen passes out of the system through the oxygen make line 126 and passageways 110. The excess refrigeration requirements may be supplied by liquid oxygen from the storage tank until the plant is completely cooled down and the turbine provides sufficient refrigeration.

Although these thaw-out and start-up procedures have been described in conjunction with externally supplied liquid oxygen, it will be understood that liquid nitrogen or liquid air could also be used. For example, if liquid nitrogen were used instead of liquid oxygen, it would be directed through the separate pass 19 of Fig. 1 or 110 of Fig. 2 during the first or air cleaning phase or thaw-out and recovered as an uncontaminated gaseous product. This same procedure could be followed during the first phase of start-up. In the final phase of start-up, nitrogen addition may be made into conduit 42 of Fig. 1 or into the condenser dome 131b of Fig. 2, allowing a portion to serve for lower column reflux and transferring the remainder through nitrogen transfer conduit to the upper column. If liquid air were used, it could be processed in the same manner as described above for liquid nitrogen except that during the final phase of start-up it could be directed into any of the air feed conduits to the lower column, the kettle of lower column, or the oxygen-enriched liquid transfer conduit.

It will be further understood that the illustrations described above are merely exemplary and that the practice of the present invention is not limited thereto but may be also practiced with various modifications thereof within the scope defined by the following claims.

As used in the claims, the term "steady state condition" may be defined as a state at which operating conditions required for any desired production rate have been established. It is, for example, exclusive of both thawing and recooling operations.

What is claimed is:

1. In a process for the low-temperature separation of a gas mixture by a two-stage rectification in which during normal operation incoming gas is compressed and is then cooled and cleaned by the passage thereof in one direction through a heat exchange zone which is cooled by outgoing product flow through such zone in the opposite direction; the steps of providing a body of stored liquid having a composition similar to one of the liquids of the rectification; holding said liquid body at low temperature; at the beginning of a shut-down period of the rectification and with the continued flow of incoming gas through the heat exchange zone, passing liquid from said body through the heat exchange zone in the same direction as outgoing product flow during normal operation to cool and clean incoming gas; heating such cleaned gas and conducting the same through the low pressure rectification stage to warm the latter to defrosting temperatures; thereafter with the exclusion of warm-up gas from such low pressure rectification stage, stopping the flow of liquid from said body through the heat exchange zone, and concurrently passing preheated gas through the heat exchange zone and the high pressure rectification stage until the latter is defrosted.

2. In a process for the low-temperature separation of air by rectification in which during normal operation compressed air to be rectified in a rectification zone is cooled and cleaned before delivery to the rectification zone by the passage thereof in one dierction through a heat exchange zone which is cooled by outgoing product flow through such zone in the opposite direction, and in which the higher boiling component of the rectification traverses an adsorbent body in the reboiling path of the rectification zone; the steps of providing a body of stored liquid having a composition similar to one of the liquids of the rectification; holding said liquid body at low temperature; during a first stage of warm-up for defrosting, passing liquid from said body through said heat exchange zone in the same direction as outgoing product flow during normal operation to cool and clean incoming air passed through the heat exchange zone; heating such cleaned air and conducting the same through the rectification zone until said adsorbent body is regenerated; thereafter, with the exclusion of warm-up air from such rectification zone, stopping the flow of liquid from said body through the heat exchange zone and concurrently passing pre-heated air through the heat exchange zone until the latter is defrosted.

3. In a process for the low-temperature separation of a gas mixture by a two-stage rectification in which during normal operation incoming gas is compressed and is then cooled and cleaned by the passage thereof in one direction through a heat exchange zone which is cooled by outgoing product flow through such zone in the opposite direction, and in which the cooled air is passed through an adsorbent body to remove residual impurities before delivery to the rectification zone; the steps of providing a body of stored liquid having a composition similar to one of the liquids of the rectification; holding said liquid body at low temperature; at the beginning of a shut-down period of the rectification and with the continued flow of incoming gas through the heat exchange zone, passing liquid from said body through the heat exchange zone in the same direction as outgoing product flow during normal operation to cool and clean incoming gas; passing cooled gas through the adsorbent body; heating the cleaned gas and conducting the same through the low pressure rectification stage to warm the latter; thereafter with the exclusion of warm-up air from such low pressure rectification stage, stopping the flow of liquid from said body through the heat exchange zone and concurrently passing pre-heated gas streams through the heat exchange zone and through the high pressure rectification stage and the adsorbent body until the adsorbent body is regenerated.

4. In a process for the low-temperature separation of a gas mixture by rectification in which during normal operation compressed gas to be rectified in a rectification zone is cooled and cleaned by the passage thereof in one direction through a heat exchange zone which is cooled by outgoing product flow through such zone in the opposite direction, and in which the cooled gas is passed through an adsorbent trap to remove residual impurities before delivery to the rectification zone; the steps of providing a stored body of liquid having a composition similar to one of the liquids of the rectification; holding said liquid body at low temperature; after thaw-out periods of the rectification, passing liquid from said body through the heat exchange zone in the same direction as outgoing product flow during normal operation to cool and clean incoming gas passed through the heat exchange zone; passing such cooled gas through the adsorbent trap and then through the rectification zone to cool the trap and the rectification zone to operating temperatures.

5. In a process for the low-temperature separation of air by a two-stage rectification in which during normal operation incoming air is compressed and is then cooled and cleaned by the passage thereof in one direction through a heat exchange zone which is cooled by outgoing product flow through such zone in the opposite direction, the steps of providing a body of stored liquid made from air; holding such liquid at low temperature; after a period of shut-down initially passing liquid from said body through said heat exchange zone in the same direction as outgoing product flow during normal operation to cool and clean incoming air passed through the heat exchange zone; circulating the cold, cleaned air through the high pressure rectification stage but excluding it from the low pressure rectification stage; then throttling it to a lower pressure and subsequently passing the air through said heat exchange zone before discharging it for additional cooling of said incoming air and removal of impurities deposited by incoming air in said zone; discontinuing the cooling of incoming air with such stored liquid when the heat exchange zone and the high pressure rectification stage reach operating temperature; thereafter utilizing refrigeration of liquid from said body to condense air in the high pressure rectification stage to provide clean reflux liquid therefor; passing products of said high pressure rectification stage to the low pressure rectification stage after throttling; and finally withdrawing rectification products from said last mentioned stage and passing them through said heat exchange zone.

6. In a process for the low-temperature separation of air by a two-stage rectification in which during normal operation incoming air is compressed and is then cooled and cleaned by the passage thereof in one direction through a heat exchange zone which is cooled by outgoing product flow through such zone in the opposite direction, the steps of providing a body of stored liquid made from air; holding such liquid at low temperature; during normal operation feeding liquid from said stored body to the rectification zone where the liquid composition is similar to that of the stored liquid body, and at a rate sufficient to supply the low temperature refrigeration which is needed in excess of that regained from the outgoing products; after a period of shut-down initially passing liquid from said body through said heat exchange zone in the same direction as outgoing product flow to cool and clean incoming air passed through the heat exchange zone, circulating the cold, cleaned air through the high pressure rectification stage but excluding it from the low pressure rectification stage; then throttling it to a lower pressure and subsequently passing the air through said heat exchange zone before discharging it; discontinuing the cooling of incoming air with such stored liquid when the heat exchange zone and the high pressure rectification stage reach operating temperature; thereafter utilizing refrigeration of liquid from said body to condense air in the high pressure rectification stage to provide clean reflux liquid therefor; passing products of said high pressure rectification stage to the low pressure rectification stage after throttling; and finally withdrawing rectification products from said last mentioned stage and passing them through said heat exchange zone.

7. In a process for the low temperature separation of air by a two-stage rectification in which during normal operation incoming air is compressed and is then cooled and cleaned by the passage thereof in one direction through a heat exchange zone which is cooled by outgoing product flow through such zone in the opposite direction, and the refrigeration required for such normal operation is produced by expansion with production of external work of a portion of the air, the steps of providing a body of liquid made from air; after a thaw-out period starting such process by initially passing liquid from said body through said heat exchange zone in the same direction as outgoing product flow to cool and clean incoming air passed through the heat exchange zone; expanding cleaned air with the production of external work; circulating work-expanded air through the low pressure rectification and subsequently passing the air through said heat exchange zone before discharging it; discontinuing the cooling of incoming air with liquid from said body when the air upstream of the work-expander has reached operating temperature; thereafter passing part of the incoming air prior to said work-expansion to the high pressure rectification stage to cool the latter; passing products of said high pressure rectification stage to the low pressure rectification stage after throttling; and finally, withdrawing rectification products from said last mentioned stage and passing them through the heat exchange zone.

8. A process as defined in claim 7, including utilizing refrigeration of liquid from said body to condense air in high pressure rectification stage to provide reflux liquid therefor after the cooling of incoming air by said liquid has been discontinued.

9. In a process for the low temperature separation of air by a two-stage rectification in which during normal operation incoming air is compressed and is then cooled and cleaned by the passage thereof in one direction through a heat exchange zone which is cooled by outgoing product flow through such zone in the opposite direction, and the refrigeration required for such normal operation is produced by expansion with production of external work of a portion of the air, the steps of providing a body of liquid made from air; after a thaw-out period starting such process by initially passing liquid from said body through said heat exchange zone in the same direction as outgoing product flow to cool and clean incoming air passed through the heat exchange zone; circulating part of the cooled, cleaned air through the high pressure rectification stage and then after throttling, through the low pressure rectification stage; expanding the rest of the cool, cleaned air with the production of external work; circulating work-expanded air through the low pressure rectification and subsequently passing all the air through said heat exchange zone before discharging it; discontinuing the cooling of incoming air with liquid from said body when the air upstream of the work-expander has reached operating temperature; thereafter passing a greater part of the incoming air prior to said work-expansion to the high pressure rectification stage to cool the latter; and finally, withdrawing rectification products from said last mentioned stage and passing them through the heat exchange zone.

10. In a system for the low-temperature separation of a higher and relatively lower-boiling impurity containing gas mixture by rectification in which during normal operation compressed gas mixture to be rectified in a rectification zone is cooled and cleaned before delivery to the rectification zone by alternate flow in one direction through either of two reversing passageways in a reversible heat exchange zone with at least most of such impurities being deposited in the reversing passageway during such gas mixture inflow and subsequently reevaporated by outgoing rectification product flowing in the opposite direction to such gas mixture through the same reversing passageway and serving to at least partially cool the gas mixture, the incoming gas mixture and outgoing rectification product streams being periodically alternated between said reversing passageways, an improved method of conditioning said rectification zone comprising the steps of providing a body of stored liquid having a composition similar to one of the liquids of the rectification; holding such liquid body at low temperature; between periods of normal operation of the rectification, selectively passing liquid from such body to said reversible heat exchange zone for passage therethrough to cool and clean incoming gas of at least said higher-boiling impurities, said incoming gas being directed through at least one of the reversing passageways of the reversible heat exchange zone; utilizing such cleaned incoming gas for conditioning said rectification zone; and during normal operation providing the low temperature refrigeration for said process which is needed in excess of that regained from the outgoing products.

11. In a system for the low-temperature separation of a higher and relatively lower-boiling impurity containing gas mixture by rectification in which during normal operation compressed gas mixture to be rectified in the rectification zone is cooled and cleaned before delivery to the rectification zone by alternate flow in one direction through either of two reversing passageways in a reversible heat exchange zone with at least most of such impurities being deposited in the reversing passageway during such gas mixture inflow and subsequently reevaporated by rectification product flowing in the opposite direction to such gas mixture through the same reversing passageway and serving to at least partially cool the gas mixture, the incoming gas mixture and outgoing rectification product streams being periodically alternated between said reversing passageways, an improved method of conditioning said rectification zone comprising the steps of providing a body of stored liquid having a composition similar to one of the liquids of the rectification; holding such liquid body at low temperature; during normal operation feeding liquid from such stored body to the rectification zone at a level where the liquid composition is similar to that of the liquid body, and at a rate sufficient to supply the low temperature refrigeration which is needed in excess of that regained from the outgoing products; between periods of normal operation of the rectification, selectively passing liquid from such body to said reversible heat exchange zone for passage therethrough to cool and clean incoming gas of at least said higher-boiling impurities, said incoming gas being directed through at least one of the reversing passageways of the reversible heat exchange zone; and utilizing such cleaned incoming gas for conditioning said rectification zone.

12. In a system for the low-temperature separation of higher and relatively lower-boiling impurity containing air by rectification in which during normal operation compressed air to be rectified in a rectification zone is cooled and cleaned before delivery to the rectification zone by alternate flow in one direction through at least two reversing passageways in a reversible heat exchange zone with at least most of such impurities being deposited in the reversing passageway during such inlet air flow and subsequently reevaporated by outgoing rectification product flowing in the opposite direction to such inlet air through the same reversing passageway and serving to at least partially cool the inlet air, the inlet air and outgoing rectification product streams being periodically alternated between said reversing passageways, an improved method of conditioning said rectification zone comprising the steps of providing a body of stored liquid oxygen; holding such liquid body at low temperature; between periods of normal operation of the rectification, selectively withdrawing liquid oxygen from such body to said reversible heat exchange zone for flow through a non-reversing passageway therein to cool and clean incoming gas of at least said higher-boiling impurities, said incoming gas being directed through at least one of the reversing passageways and simultaneously vaporize the withdrawn liquid oxygen; utilizing such cleaned incoming gas for conditioning said rectification zone; and during normal operation providing the low temperature refrigeration for said process which is needed in excess of that regained from the outgoing products.

References Cited in the file of this patent
UNITED STATES PATENTS

| | | |
|---|---|---|
| 1,015,800 | Janecke | Jan. 30, 1912 |
| 2,180,715 | Messer | Nov. 21, 1939 |
| 2,503,939 | De Baufre | Apr. 11, 1950 |
| 2,622,416 | Ogorzaly | Dec. 23, 1952 |
| 2,640,332 | Keyes | June 2, 1953 |
| 2,650,481 | Cooper | Sept. 1, 1953 |
| 2,664,718 | Rice | Jan. 5, 1954 |
| 2,685,180 | Schlitt | Aug. 3, 1954 |
| 2,685,181 | Schlitt | Aug. 3, 1954 |
| 2,698,523 | Hnilicka | Jan. 4, 1955 |
| 2,708,831 | Wilkinson | May 24, 1955 |
| 2,793,507 | Hnilicka | Mar. 28, 1957 |